(12) United States Patent
Suwa et al.

(10) Patent No.: US 9,090,771 B2
(45) Date of Patent: Jul. 28, 2015

(54) RELEASE FILM FORMED FROM POLYLACTIC ACID-CONTAINING RESIN

(75) Inventors: Toshihiro Suwa, Kanagawa (JP); Aizoh Sakurai, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 689 days.

(21) Appl. No.: 13/146,357

(22) PCT Filed: Jan. 15, 2010

(86) PCT No.: PCT/US2010/021154
§ 371 (c)(1),
(2), (4) Date: Jul. 26, 2011

(87) PCT Pub. No.: WO2010/088067
PCT Pub. Date: Aug. 5, 2010

(65) Prior Publication Data
US 2011/0287206 A1    Nov. 24, 2011

(30) Foreign Application Priority Data

Jan. 30, 2009    (JP) .................................. 2009-020474

(51) Int. Cl.
*C08L 67/04* (2006.01)
*C08G 77/392* (2006.01)
*C08G 77/442* (2006.01)
*C08L 33/10* (2006.01)
*C08L 33/08* (2006.01)

(52) U.S. Cl.
CPC .............. *C08L 67/04* (2013.01); *C08G 77/392* (2013.01); *C08G 77/442* (2013.01); *C08L 33/08* (2013.01); *C08L 33/10* (2013.01); *Y10T 428/1476* (2015.01)

(58) Field of Classification Search
None
See application file for complete search history.

(56) References Cited

U.S. PATENT DOCUMENTS

| | | | |
|---|---|---|---|
| 5,691,398 A * | 11/1997 | Tanifuji et al. ................. | 523/124 |
| 6,251,512 B1 * | 6/2001 | Gustafson et al. ............ | 428/323 |
| 6,541,109 B1 * | 4/2003 | Kumar et al. ................. | 428/352 |
| 7,385,020 B2 * | 6/2008 | Anderson et al. ............. | 526/318 |
| 7,589,151 B2 * | 9/2009 | Aoki et al. ....................... | 525/64 |
| 8,470,420 B2 * | 6/2013 | Hiruma et al. ............... | 428/34.9 |
| 2007/0276090 A1 * | 11/2007 | Aoki et al. ....................... | 525/70 |
| 2009/0030132 A1 * | 1/2009 | Kumazawa et al. .......... | 524/493 |

(Continued)

FOREIGN PATENT DOCUMENTS

| EP | 159683 A2 * | 10/1985 |
|---|---|---|
| EP | 1721936 | 11/2006 |

(Continued)

OTHER PUBLICATIONS

International Search Report for PCT/US2010/021154, 3 pages.

*Primary Examiner* — Alicia Chevalier
*Assistant Examiner* — Scott R Walshon
(74) *Attorney, Agent, or Firm* — Eric E. Silverman

(57) ABSTRACT

Polylactic acid-containing resin composition that includes a polylactic acid; and a (meth)acryl-silicone copolymer that includes a methyl (meth)acrylate; and a reactive silicone, wherein the (meth)acryl-silicone copolymer has a weight average molecular weight of 25,000 or more. Methods for producing a polylactic acid-containing resin composition, polylactic acid-containing resin films, polylactic acid-containing resin release films, polylactic acid-containing resin release films, and methods for producing polylactic acid-containing resin films are also disclosed.

7 Claims, 3 Drawing Sheets

(56) References Cited

U.S. PATENT DOCUMENTS

2009/0074999 A1* 3/2009 Hiruma et al. ............... 428/34.9
2011/0300296 A1* 12/2011 Sherman et al. ........... 427/208.4

FOREIGN PATENT DOCUMENTS

| | | |
|---|---|---|
| EP | 1887029 | 2/2008 |
| JP | 01146977 | 6/1989 |
| JP | 07-044104 | 2/1995 |
| JP | 08302306 | 11/1996 |
| JP | 11-320594 | 11/1999 |
| JP | 2000-280429 | 10/2000 |
| JP | 2003-026837 | 1/2003 |
| JP | 2003-286401 | 10/2003 |
| JP | 2004-010842 | 1/2004 |
| JP | 2008231365 | 10/2008 |
| WO | WO 2007007435 A1 * | 1/2007 |
| WO | WO 2009138388 A1 * | 11/2009 |

* cited by examiner

RELEASE FILM FORMED FROM POLYLACTIC ACID-CONTAINING RESIN

CROSS REFERENCE TO RELATED APPLICATIONS

This application is a national stage filing under 35 U.S.C. 371 of PCT/US2010/021154, filed Jan. 15, 2010, which claims priority to Japanese Application No. 2009-020474, filed Jan. 30, 2009, the disclosure of which is incorporated by reference in its/their entirety herein.

FIELD

A resin composition containing a polylactic acid as the main component and a polylactic acid-containing resin film, particularly a polylactic acid-containing releasable resin film, are described.

BACKGROUND

Releasable sheets are roughly classified based on the composition of the substrate, into releasable sheets prepared from petroleum-derived synthetic polymers such as polyesters and polyolefins and releasable sheets prepared from various paper substrates such as glassine paper and clay coated paper. Releasable sheets are used for the purpose of protecting a pressure-sensitive adhesive surface or other material surfaces. Once the releasable sheets are no longer required after use, they are usually discarded. However, with environmental awareness growing in recent years, a petroleum-derived synthetic polymer film is sometimes regarded as imposing a high impact on the environment. On the other hand, a paper substrate subjected to a predetermined treatment may be recycled as wastepaper. From the standpoint of transparency, smoothness, dust resistance and the like, however, paper tends to be inferior to a releasable sheet formed from a synthetic polymer film.

Polylactic acid (PLA) is receiving significant consideration as an environmentally friendly resin. PLA is a biomass-derived resin that is classified as a renewable resource because it is made from plants such as corn or sugarcane. PLA requires a relatively small amount of energy for production and typically generates a relatively small amount of carbon dioxide per unit weight when incinerated.

However, PLA films tend to have poor heat resistance when compared to general-purpose aromatic polyester films. Therefore, unlike a polyester film, PLA-based films cannot be readily heat-cured (for example at 140 to 160° C.) after a reactive silicone has been coated thereon. For example, as described in Kokai (Japanese Unexamined Patent Publication) No. 2000-280429, even reactive silicones that can be cured at relatively low temperatures (for example 100° C.) can cause deformation of a PLA film. The thermal damage to the PLA film could be reduced by shortening the cure time. However, shorter cure times require the use of large amounts of expensive catalysts. Such catalysts would likely render the PLA releasable sheets too expensive for regular use. The short time and/or low temperatures of such curing can also leave the silicone partially uncured which could allow it to migrate into the pressure-sensitive adhesive surface and impair the residual adhesive force of the pressure-sensitive adhesive.

Because of the drawbacks noted above, there remains a need for new environmentally responsible releaseable sheets that still provide acceptable properties.

SUMMARY

Polylactic acid-containing resin compositions and films prepared from these compositions are described. More particularly, the polylactic acid-containing resin includes a blend of polylactic acid and a (meth)acryl-silicone copolymer. Films prepared from the polylactic acid-containing resin compositions can be used, for example, to prepare releasable sheets.

In a first aspect, a polylactic acid (PLA)-containing resin composition is provided. The polylactic acid-containing resin composition includes a polylactic acid and a (meth)acryl-silicone copolymer. The (meth)acryl-silicone copolymer has a weight average molecular weight of 25,000 grams/mole or more and is formed from (i) methyl (meth)acrylate and (ii) a reactive silicone. The (meth)acryl-silicone copolymer contains 10 to less than 50 weight percent silicone based on a total weight of the (meth)acryl-silicone copolymer.

In a second aspect, polylactic acid-containing film is provided. The polylactic acid-containing film includes a polylactic acid-containing resin composition. The polylactic acid-containing resin composition includes a polylactic acid and a (meth)acryl-silicone copolymer. The (meth)acryl-silicone copolymer has a weight average molecular weight of 25,000 grams/mole or more and is formed from (i) methyl (meth)acrylate and (ii) a reactive silicone. The (meth)acryl-silicone copolymer contains 10 to less than 50 weight percent silicone based on a total weight of the (meth)acryl-silicone copolymer. When the film has a thickness of 30 micrometers (μm), the film has a haze value of 10 percent or less when measured in accordance with JIS K 7136. In some embodiments, the polylactic acid-containing films are used as releasable sheets that are positioned adjacent to a pressure-sensitive adhesive layer.

In a third aspect, a method of producing a polylactic acid-containing resin composition is provided. The method includes producing a (meth)acryl-silicone copolymer and mixing the (meth)acryl-silicone copolymer with a polylactic acid. The (meth)acryl-silicone copolymer has a weight average molecular weight of 25,000 grams/mole or more and is formed from (i) methyl (meth)acrylate and (ii) a reactive silicone. The (meth)acryl-silicone copolymer contains 10 to less than 50 weight percent silicone based on a total weight of the (meth)acryl-silicone copolymer.

In a fourth aspect, a method of producing a polylactic acid-containing film is provided. The method includes forming a polylactic acid-containing resin composition and extruding the polylactic acid-containing resin into the polylactic acid-containing film. The polylactic acid-containing resin is formed by producing a (meth)acryl-silicone copolymer and mixing the (meth)acryl-silicone copolymer with a polylactic acid. The (meth)acryl-silicone copolymer has a weight average molecular weight of 25,000 grams/mole or more and is formed from (i) methyl (meth)acrylate and (ii) a reactive silicone. The (meth)acryl-silicone copolymer contains 10 to less than 50 weight percent silicone based on a total weight of the (meth)acryl-silicone copolymer.

In a fifth aspect, a film laminate is provided. The film laminate includes a first polylactic acid-containing film that is a release film that is positioned adjacent to a second polylactic acid-containing film. The first polylactic acid-containing film includes a polylactic acid-containing resin composition. The polylactic acid-containing resin composition includes a polylactic acid and a (meth)acryl-silicone copolymer. The (meth)acryl-silicone copolymer has a weight average molecular weight of 25,000 grams/mole or more and is formed from (i) methyl (meth)acrylate and (ii) a reactive silicone. The (meth)acryl-silicone copolymer contains 10 to less than 50 weight percent silicone based on a total weight of the (meth)acryl-silicone copolymer.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

Figure 1:
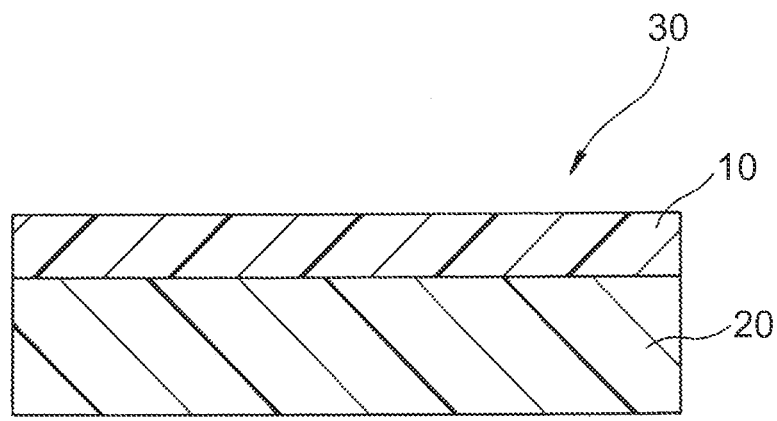
FIG. 1 is a transverse cross-sectional view of an embodiment of a PLA-containing releasable resin film laminate.
Figure 2:
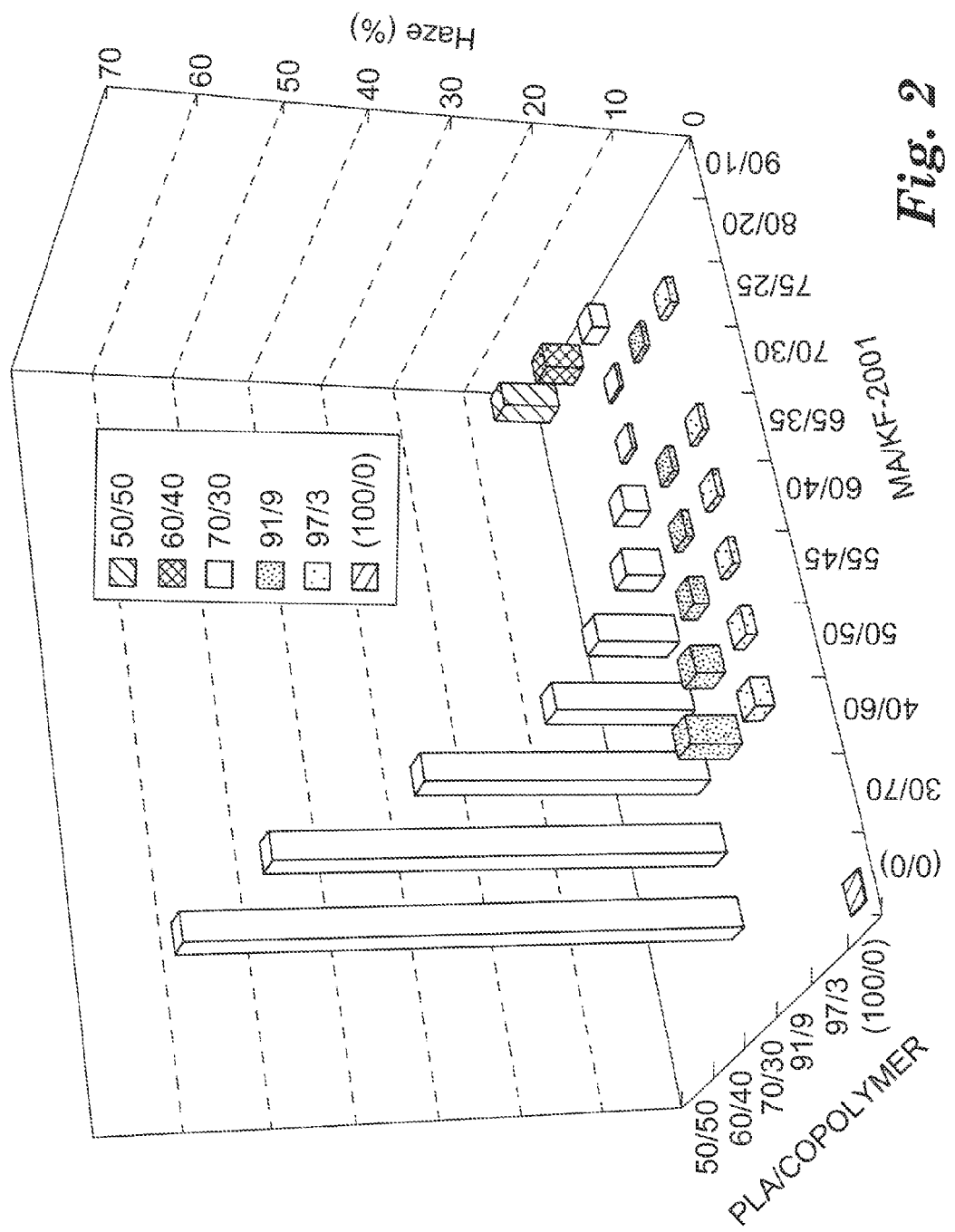
FIG. 2 is a three-dimensional bar graph illustrating the haze value (%) of the PLA-containing resin film when the compositional ratio of methyl acrylate (MA) and silicone (KF-2001) in the copolymer and the blending ratio of PLA and copolymer in the compositions are changed.
Figure 3:
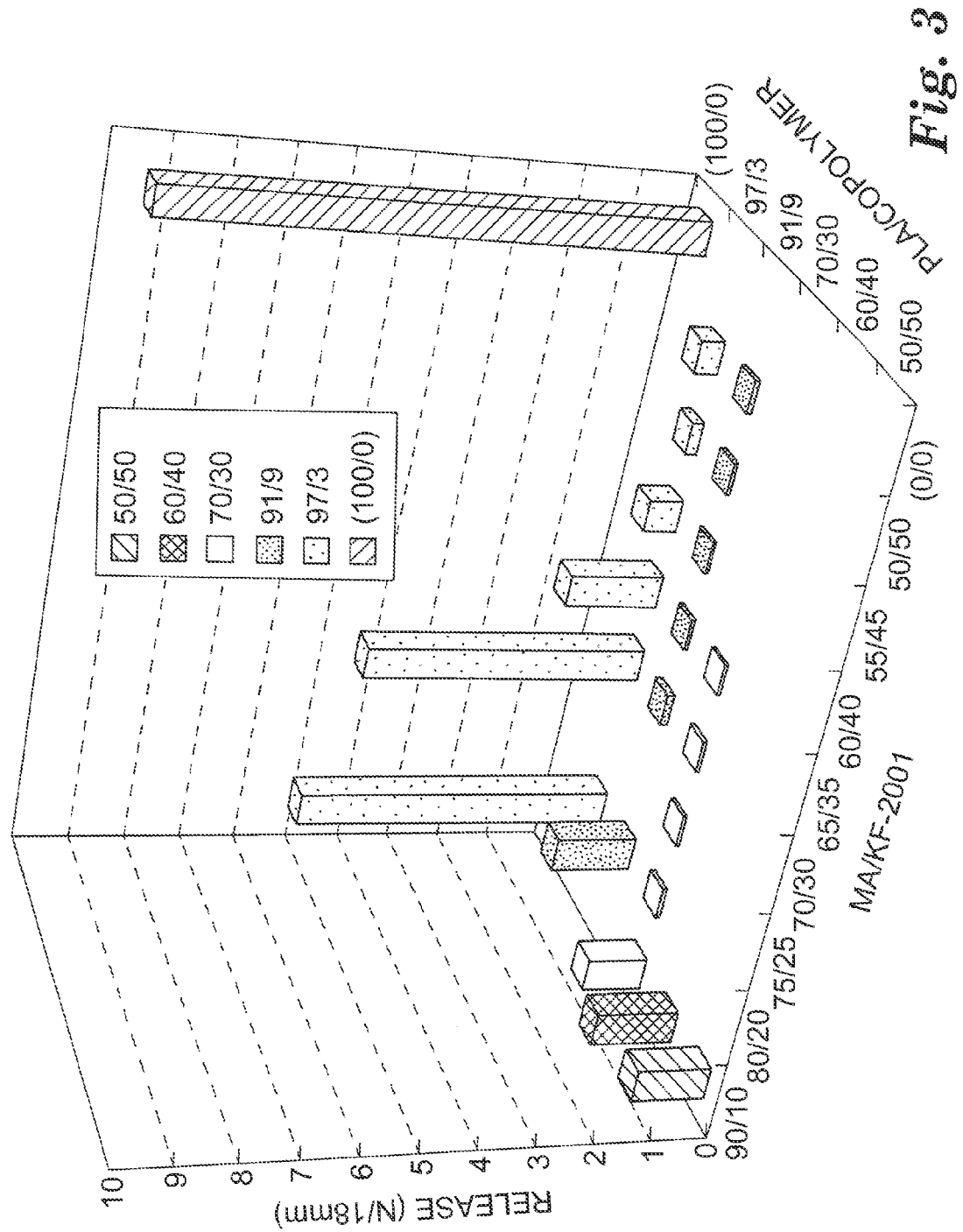
FIG. 3 is a three-dimensional bar graph illustrating the peel force (N/18 mm) of the PLA-containing resin film when the compositional ratio of methyl acrylate (MA) and silicone (KF-2001) in the copolymer and the weight ratio of PLA and copolymer in the compositions are changed.

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense. The definitions provided herein are to facilitate understanding of certain terms used frequently herein and are not meant to limit the scope of the present disclosure.

DETAILED DESCRIPTION

Polylactic acid-containing resin compositions and films prepared from these compositions are described. More particularly, the polylactic acid-containing resin includes a blend of polylactic acid and a (meth)acryl-silicone copolymer. Films prepared from the polylactic acid-containing resin compositions can be used, for example, to prepare releasable sheets. Methods of making the polylactic acid-containing resin compositions and methods of making films from these compositions are described.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

All amounts given herein are based on weight unless indicated otherwise.

Molecular weight as referred to herein, generally refers to weight average molecular weight, in terms of polystyrene, of the polymer. The molecular weight may be measured by gel permeation chromatography (GPC).

The terms "(meth)acryl", "(meth)acrylate" and "(meth)acryloyl" include acryl and methacryl, acrylate and methacrylate, and acryloyl and methacryloyl, respectively.

The polylactic acid-containing resin composition includes (A) a polylactic acid and (B) a (meth)acryl-silicone copolymer. The (meth)acryl-silicone copolymer (B) has a weight average molecular weight of 25,000 grams/mole or more and is formed from (i) methyl (meth)acrylate and (ii) a reactive silicone. The (meth)acryl-silicone copolymer contains 10 to less than 50 weight percent silicone based on a total weight of the (meth)acryl-silicone copolymer.

In some embodiments, the polylactic acid-containing resin composition in formed into a film. Films prepared from the polylactic acid-containing resin can have high transparency and low haze. When the film has a thickness of 30 micrometers, the film can have haze values of about 10 percent or less when measured using JIS K 7136. The polylactic acid-containing films can be used as releasable films for placement adjacent to a pressure-sensitive adhesive layer. When the release film has a thickness of 30 micrometers, the release film can have peel forces of about 65 percent or less of the peel force compared to a film containing only the polylactic acid.

Films prepared from the polylactic acid-containing resin composition can have releasability based on the presence of the silicone moiety of the (meth)acryl-silicone copolymer. When positioned next to a pressure-sensitive adhesive layer, there is little or no migration of the polylactic acid-containing resin composition into the pressure-sensitive adhesive layer. That is, there is little or no bleed from the releasable sheet into the pressure-sensitive adhesive layer that could result in a reduction in the adhesive strength of the pressure-sensitive adhesive layer.

The peel strength can be measured using JIS Z 0237 by placing the polylactic acid-containing release film adjacent to a pressure-sensitive adhesive such as, for example, a pressure sensitive adhesive commercially available under the trade designation SCOTCH 810 from Sumitomo 3M Limited (Japan). Although JIS Z 0237 is meant primarily for the measurement of the "self-adhesive force" of a pressure-sensitive adhesive, it can be used to measure the "peel force" of the releasable sheet from a pressure-sensitive adhesive.

The PLA and the (meth)acryl-silicone copolymer may be completely or almost completely compatibilized with each other. That is, a miscible system blend or a partially miscible system blend can form. The phrase "miscible system blend" refers to a miscible and monophase system blend where the components are in a uniformly compatibilized state. The phrase "partially miscible system blend" refers to a partially miscible and phase separated system blend where the components are in a phase separated state but at least partially compatibilized.

Whether a PLA-containing resin composition is a miscible system blend or a partially miscible system blend can be determined by measuring the glass transition point (Tg) of the PLA-containing resin composition. The Tg can be measured using a differential scanning calorimeter (referred to herein as "DSC"). If the Tg is observed at a single point, the components of the PLA-containing resin composition are in a compatibilized state. If the Tg is observed at two points, the components of the PLA-containing resin composition are in a phase separated state.

Partially miscible system blends can have a phase separated state that can be described as having a co-continuous structure or an island and sea structure. More specifically, in a partially miscible system blend, the PLA and the (meth) acryl-silicone copolymer can sometimes form a continuous structure in combination, or the blend may have a structure in which fine particles (islands) of the (meth)acryl-silicone copolymer are almost uniformly dispersed in the matrix (sea) of the PLA or conversely, a structure in which fine particles (islands) of the PLA are almost uniformly dispersed in the matrix (sea) of the (meth)acryl-silicone copolymer. These components are at least partially miscible, and therefore a miscible segment can assist in compatibilizing an immiscible segment in the blend. The phrase "an at least partially compatibilized PLA-containing resin blend" can refer to a partially compatibilized PLA-containing resin composition, a completely compatibilized PLA-containing resin, or something in between.

In partially miscible system blends of PLA-containing resin compositions, the Tg of the PLA-rich phase and/or the Tg of the (meth)acryl-silicone copolymer-rich phase can be shifted by several degrees Celcius from the original Tg of the pure component. Such shifts show that the (meth)acryl-silicone copolymer is partially compatibilized with the PLA-rich phase and/or that the PLA is partially compatibilized with the (meth)acryl-silicone copolymer-rich phase. The degree of the Tg shift can usually be about 3° C. or more, about 3.5° C. or more, or about 4° C. In other words, when the PLA-containing resin composition is in a "partially compatibilized" state, the composition will have two Tg values, one derived from the PLA and one derived from the (meth)acryl-silicone copolymer, but at least one of these Tg values will be shifted towards the other Tg value.

The PLA in the PLA-containing resin compositions is not particularly limited. The PLA can be poly(L-lactic acid), where the constituent units are composed of only L-lactic acid; poly(D-lactic acid), where the constituent units are composed of only D-lactic acid; and poly(D/L-lactic acid), where both L-lactic acid units and D-lactic acid units are present at various ratios can all be utilized. A copolymer of an L- or D-lactic acid and an aliphatic hydroxycarboxylic acid (other than lactic acid) such as glycolic acid, 3-hydroxybutyric acid, 4-hydroxybutyric acid, 4-hydroxyvaleric acid, 5-hydroxyvaleric acid or 6-hydroxycaproic acid, may also be utilized as the PLA. One or more than one kind of PLA can be utilized in PLA-containing resin compositions.

The PLA can be produced by directly subjecting an L-lactic acid, a D-lactic acid or a D/L-lactic acid mixture to dehydration-polycondensation, or may be produced by ring-open polymerizing a lactide, which is a cyclic dimer of lactic acid. The ring-open polymerization may be performed in the presence of a compound having a hydroxyl group, such as a higher alcohol or hydroxycarboxylic acid. The copolymer of a lactic acid and another aliphatic hydroxycarboxylic acid can be produced by performing dehydration-polycondensation of a lactic acid and the aliphatic hydroxycarboxylic acid or may be produced by ring-open copolymerizing a lactide, with a cyclic form of the aliphatic hydroxycarboxylic acid. An exemplary method of producing a PLA can be found in Kokai Nos. 2003-286401 and 2004-10842.

Some suitable polylactic acids utilized herein can contain an aliphatic polyester resin having a lactic acid unit, an aliphatic polyvalent carboxylic acid unit, and an aliphatic polyhydric alcohol unit as constituent units. Examples of aliphatic polyvalent carboxylic acids that can be used in the production of the polyester resins having a lactic acid unit can include oxalic acid, succinic acid, malonic acid, glutaric acid, adipic acid, pimelic acid, suberic acid, azelaic acid, undecanedioic acid, dodecanedioic acid, and anhydrides thereof. These aliphatic polyvalent carboxylic acids may also be an acid anhydride or a mixture including an acid anhydride. Examples of the aliphatic polyhydric alcohol that can be used in the preparation of polylactic acids can include ethylene glycol, diethylene glycol, triethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, tetramethylene glycol and 1,4-cyclohexanedimethanol.

An aliphatic polyester resin containing a lactic acid unit, an aliphatic polyvalent carboxylic acid unit, and an aliphatic polyhydric alcohol unit can be prepared by reacting the aliphatic polyvalent polycarboxylic acid and aliphatic polyhydric alcohol (for example) with a PLA or a copolymer of a lactic acid and another hydroxycarboxylic acid. Another method includes reacting the aliphatic polyvalent carboxylic acid and aliphatic polyhydric alcohol with a lactic acid. Yet another method includes reacting the aliphatic polyvalent carboxylic acid and aliphatic polyhydric alcohol (for example) with a lactide, or a cyclic ester of the hydroxycarboxylic acid.

Other suitable polylactic acids can contain an aliphatic polyester resin having a lactic acid unit and a polyfunctional polysaccharide. Examples of polyfunctional polysaccharides include cellulose, cellulose nitrate, cellulose acetate, methyl cellulose, ethyl cellulose, carboxymethyl cellulose, nitrocellulose, CELLOPHANE, viscose rayon, regenerated cellulose such as cupra, hemicellulose, starch, amylopectin, dextrin, dextran, glycogen, pectin, chitin, chitosan, a mixture thereof, and their derivatives. In some embodiments, cellulose acetate and ethyl cellulose can be utilized as the polyfunctional polysaccharides.

An aliphatic polyester resin containing a lactic acid unit and a polyfunctional polysaccharide can be prepared by reacting the polyfunctional polysaccharide with a lactic acid or with a PLA or a copolymer of a lactic acid and another hydroxycarboxylic acid. Yet another method includes reacting the polyfunctional polysaccharide with a lactide which is a cyclic dimmer of lactic acid, or a cyclic ester of the hydroxycarboxylic acid.

In some embodiments, the PLA that is utilized can include a homopolymer of a lactic acid, a copolymer of lactic acid, a copolymer of a lactic acid and an aliphatic hydroxycarboxylic acid (other than lactic acid), an aliphatic polyester resin comprising a lactic acid, an aliphatic polyvalent carboxylic acid and an aliphatic polyhydric alcohol, or the like. Exemplary copolymers of lactic acids include a copolymer of L-lactic acid and D-lactic acid, and a copolymer of a lactic acid homopolymer and a lactic acid copolymer of L-lactic acid and D-lactic acid. In an embodiment where a copolymer of a lactic acid and an aliphatic hydroxycarboxylic acid is utilized, the copolymer often contains about 50 weight percent or more of the lactic acid component. In an embodiment where an aliphatic polyvalent carboxylic acid and an aliphatic polyhydric alcohol is utilized, the copolymer can contain about 50 weight percent or more of the lactic acid component.

Polylactic acids that are utilized herein can have various molecular weights based on the physical properties that are desired in the article to be produced from the PLA-containing resin composition. As long as sufficient mechanical properties and desired effects are obtained when the composition is formed into a film, sheet or the like, the molecular weight of the PLA is not particularly limited. If the molecular weight of the PLA is too low, however, the article can suffer from decreased strength and a rapid decomposition rate. If the elongation property of a film or sheet thereof is important, the weight average molecular weight of the PLA can be about 10,000 grams/mole or more as measured by gel permeation chromatography (GPC) using polystyrene as the standard. In some embodiments, the weight average molecular weight of the PLA may be about 50,000 grams/mole or more, about 70,000 grams/mole or more, about 90,000 grams/mole or more, about 100,000 grams/mole or more, about 500,000 grams/mole or more, or about 1,000,000 grams/mole or more. If the molecular weight of the PLA is too high, the composition can deteriorate during processing and can become hard to shape. In some embodiments, the molecular weight of the PLA may be about 5,000,000 grams/mole or less, about 2,000,000 grams/mole or less, 1,000,000 grams/mole or less, or 500,000 grams/mole or less.

PLA-containing resin compositions also include a (meth)acryl-silicone copolymer. As used herein, the term "(meth)acryl-silicone copolymer refers to a copolymer that includes (i) a (meth)acrylic component formed from the use of various monomers having a (meth)acryloyl group such as methyl (meth)acrylate and (ii) a silicone component. The (meth)acryl-silicone copolymer is formed from i) a methyl (meth)acrylate and (ii) a reactive silicone. Stated different, the (meth)acryl-silicone compound can include a first component derived from monomers such as methyl (meth)acrylate and a second component derived from a silicone. As used herein, the term "reactive silicone" refers to a silicone-based material that can react with a methyl (meth)acrylate to form the (meth)acryl-silicone copolymer.

The molecular weight of the (meth)acryl-silicone copolymer can be chosen based on a number of factors such as, for example, the molecular structure of the PLA, the crystallinity of the PLA, the molecular structure of the (meth)acryl-silicone copolymer, and the like. In some embodiments where the weight average molecular weight of the (meth)acryl-silicone copolymer is about 25,000 grams/mole or more as measured by GPC, bleed-out of the (meth)acryl-silicone copolymer from the PLA over time can be suppressed. In some embodiments, the weight average molecular weight of the (meth)acryl-silicone copolymer can be about 30,000 grams/mole or more, about 35,000 grams/mole or more, or about 40,000 grams/mole or more. If the weight average molecular weight is too high, however, the viscosity of the (meth)acryl-silicone copolymer may be so high that good mixing with the PLA is difficult. In some embodiments the molecular weight of the (meth)acryl-silicone copolymer is about 150,000 grams/mole or less, about 120,000 or less, or about 100,000 or less.

The molecular structure of the (meth)acryl-silicone copolymer may vary widely. The (meth)aryl-silicone copolymer is prepared from methyl (meth)acrylate and a silicone. A polymer of methyl (meth)acrylate may be bonded directly to a silicone or may be bonded indirectly (via other molecules) to a silicone using an appropriate functional group. Appropriate functional groups can include hydroxyl groups, isocyanate groups or epoxy groups. Alternatively, a reactive group contained in a silicone may be reacted during the polymerization of a methyl (meth)acrylate to form the (meth)acryl-silicone copolymer. In some embodiments, the (meth)acryl-silicone copolymer can be a block copolymer, a graft copolymer or a combination thereof, where a methyl (meth)acrylate block and a silicone block are present. In such copolymers, both the portion of the (meth)acryl-silicone copolymers derived from (meth)acrylate and the portion of the (meth)acryl-silicone copolymer derived from silicone extend for a certain length within the molecule and therefore effectively exert their inherent properties. Such properties can include, for example, miscibility with PLA or releasability.

A portion of the (meth)acryl-silicone copolymer is formed from a methyl (meth)acrylate. The methyl (meth)acrylate can be methyl acrylate, methyl methacrylate or a combination thereof. Although not wishing to be bound by theory, the portion of the (meth)acryl-silicone copolymer that is formed from the methyl (meth)acrylate has an affinity for the polylactic acid in the PLA-containing resin composition. This affinity allows the formation of a miscible system blend or partially miscible system blend when the PLA is mixed with the (meth)acryl-silicone copolymer.

The silicone portion of the (meth)acryl-silicone copolymer can be a polymer having a polysiloxane skeleton with a side chain that can include a hydrogen atom, a hydroxyl group, a $C_1$ to $C_6$ alkyl group, a $C_1$ to $C_6$ alkyl halide group, or a substituted or unsubstituted $C_6$ to $C_{10}$ aryl group. In some embodiments, the side chain can include a hydrogen atom, a hydroxyl group or a $C_1$ to $C_3$ alkyl group. In some embodiments, the side chain can include a methyl group.

If the (meth)acryl-silicone copolymer is formed by reacting a silicone during the polymerization of a methyl (meth)acrylate, at least one radical reactive group, such as a vinyl group, an allyl group, an isopropenyl group, an allyloxy group, a (meth)acryloyl group or a mercapto group, can also be contained in a side chain, in one or both end groups (terminal groups), or a combination thereof. In some embodiments, because of their relatively good reactivity with the methyl (meth)acrylate, the radical reactive group can be a (meth)acryloyl group or a mercapto group.

(Meth)acryloyl groups and mercapto groups function in the formation of the copolymer in different ways. If a (meth)acryloyl group is included, it undergoes a polymerization reaction with other radical reactive groups and becomes a repeating unit of the molecular chain of the polymer. If a mercapto group is included, it undergoes an addition reaction with other radical reactive groups to stop the radical reaction and forms a terminal portion of the copolymer. For example, when using a silicone with a mercapto group in the side chain, a graft copolymer having a silicone as the main chain and a poly(methyl (meth)acrylate) as the side chain is obtained. On the other hand, when using a silicone with a (meth)acryloyl group as a terminal group, the (meth)acryloyl group is polymerized together with the methyl (meth)acrylate and a graft copolymer having a poly(methyl(meth)acrylate) as the main chain and a silicone as the side chain can obtained. Alternatively, when using a silicone with a mercapto group at both terminal positions (i.e., terminal mercapto groups or mercapto end capping groups), a block copolymer with a poly(methyl (meth)acrylate) bonded to those mercapto groups can be obtained. As shown by these examples, appropriate selection of the kind and position of the radical reactive groups can produce copolymers having various molecular structures.

The weight average molecular weight of the silicone may generally be about 500 grams/mole or more. When the weight average molecular weight of the silicone is about 500 or more, the PLA-containing resin composition can generally exhibit properties inherent in a silicone, such as releasability or water repellency. In some embodiments, the weight average molecular weight of the silicone may be about 1,000 grams or more, about 2,000 grams/mole, about 5,000 grams/mole, or about 10,000 grams/mole. In some embodiments, the weight average molecular weight of the silicone may be about 50,000 or less. When the molecular weight of the silicone is about 50,000 grams/mole or less, the PLA and the (meth)acryl-silicone copolymer can be effectively mixed to form an at least partially compatibilized PLA-containing resin composition. In some embodiments, the molecular weight of the silicone may be about 40,000 grams/mole or less, about 30,000 grams/mole or less, about 20,000 grams/mole or less, or about 10,000 or less.

Examples of reactive silicones that may be utilized include compounds of formula (I).

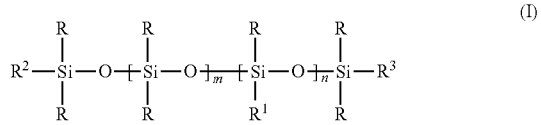

(I)

In formula (I), the variable m may be an integer of about 10 to about 600. When m is about 10 or more, the PLA-containing resin composition can exhibit properties of a silicone, such as releasability and water repellency. When m is about 600 or less, the PLA and the (meth)acryl-silicone copolymer can be effectively mixed so that an at least partially compatibilized PLA-containing resin composition can be obtained. In some embodiments, the variable m is an integer of about 20 to about 500 or about 40 to about 400 or about 50 to about 300.

The variable n in Formula (I) may be equal to zero or to an integer equal to at least one. The variable n is often equal to an integer of about 50 or less. When n is about 50 or less, the formation of a gel during production of the (meth)acryl-silicone copolymer can be prevented. In some embodiments, the variable n is equal to an integer of about 40 or less, about 30 or less, or about 20 or less.

Each R in Formula (I) may independently be a hydrogen atom, a hydroxyl group, a $C_1$ to $C_6$ alkyl group, a $C_1$ to $C_6$ alkyl halide group, or a substituted or unsubstituted $C_6$ to $C_{10}$ aryl group. In some exemplary embodiments, each R can independently be a hydrogen atom, a hydroxyl group or a $C_1$ to $C_3$ alkyl group. In some particular embodiments, each R is a methyl group.

Each $R^1$ in Formula (I) may independently be a radical reactive group selected from a vinyl group, an allyl group, an isopropenyl group, an allyloxy group, a (meth)acryloyl group or a mercapto group. In some embodiments, each $R^1$ can independently be chosen from a (meth)acryloyl group or a mercapto group.

When the variable n is equal to 1 or more, $R^2$ and $R^3$ each may independently be a hydrogen atom, a hydroxyl group, a $C_1$ to $C_6$ alkyl group, a $C_1$ to $C_6$ alkyl halide group, a substituted or unsubstituted $C_6$ to $C_{10}$ aryl group, a vinyl group, an allyl group, an isopropenyl group, an allyloxy group, a (meth)acryloyl group or a mercapto group. In some embodiments when n is 1 or more, $R^2$ and $R^3$ may each independently be a hydrogen atom, a hydroxyl group, a $C_1$ to $C_3$ alkyl group, a (meth)acryloyl group or a mercapto group.

When n is equal to zero (i.e., when a radical reactive group is not present in the side chain of the silicone), one of $R^2$ and $R^3$ or both $R^2$ and $R^3$ are each independently a radical reactive group selected from a vinyl group, an allyl group, an isopropenyl group, an allyloxy group, a (meth)acryloyl group and a mercapto group. In some embodiments when n is 0, one of $R^2$ and $R^3$ or both $R^2$ and $R^3$ are each independently a (meth)acryloyl group or a mercapto group. As long as at least one of $R^2$ and $R^3$ is selected from one of these groups, the other $R^2$ or $R^3$ group can be a hydrogen atom, a hydroxyl group, a $C_1$ to $C_6$ alkyl group, a $C_1$ to $C_6$ alkyl halide group, or a $C_6$ to $C_{10}$ aryl group.

Examples of reactive silicones of formula (I) include mercapto-modified silicones such as those commercially available under the trade designations KF-2001, KF-2004, and X-22-167B from Shin-Etsu Chemical Co., Ltd. (Tokyo, Japan), under the trade designations SMS-022, SMS-042, and SMS-992 from Gelest (Morrisville, Pa.), and under the trade designation PS848, PS849, PS849.5, PS850, PS850.5 and PS927 from United Chemical Technologies, Inc. (Bristol, Pa.). Other reactive silicones are methacryl-modified silicones such as those commercially available under the trade designations X-22-174DX, X-22-2426 and X-22-2475 from Shin-Etsu Chemical Co., Ltd. (Tokyo, Japan). These commercially available products often have different molecular weights, molecular weight distributions, equivalents of radical reactive groups, or the like. The reactive silicone can be selected based on desired properties in the final PLA-containing resin composition or film thereof.

The (meth)acryl-silicone copolymer may optionally be formed from other components other than (i) a methyl (meth)acrylate and (ii) a reactive silicone. For example a third optional component can be formed from a (meth)acrylic acid ester. The component derived from the (meth)acrylic ester can be used to adjust the miscibility of the (meth)acryl-silicone copolymer for use with various PLAs. Exemplary (meth)acrylic acid ester are shown by formulas (II), (III), and (IV),

(II)

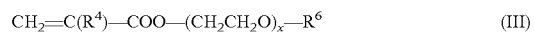

(III)

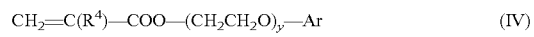

(IV)

Each $R^4$ group is a hydrogen atom or a methyl group. Each $R^5$ group is a $C_2$ to $C_{14}$ alkyl group. In some embodiments, $R^5$ can be a $C_2$ to $C_8$ alkyl group. Each $R^6$ group is a methyl group or an ethyl group. Group Ar is to an aryl group. In some embodiments, group Ar can be a phenyl group. Each variable x and y are each integers equal to 1 or more.

Examples of (meth)acrylic acid esters of formula (II) include, but are not limited to, ethyl (meth)acrylate and n-butyl (meth)acrylate. Examples of (meth)acrylic acid esters of formula (III) include, but are not limited to, methoxyethyl (meth)acrylate, methoxytriethylene glycol (meth)acrylate and methoxynonaethylene glycol (meth)acrylate. Examples of (meth)acrylic acid esters of formula (IV) include, but are not limited to, phenoxyethyl (meth)acrylate and phenoxytetraethylene glycol (meth)acrylate. One or more than one of these optional compounds may be used.

Still other optional components can be used to form the (meth)acryl-silicone. For example, a reaction mixture used to form the (meth)acryl-silicone can optionally include various radical polymerizable monomers such as (meth)acrylic acid, 2-hydroxyethyl (meth)acrylate, glycidyl (meth)acrylate, N,N-dimethylaminoethyl (meth)acrylate, ethylene, propylene, styrene, vinyl acetate, vinyl ether, vinyl chloride, acrylonitrile, N-vinylpyrrolidone, butadiene and isoprene. The amount of any such optional radical polymerizable monomers may be chosen to be included in the (meth)acryl-silicone is often based on the desired properties of the PLA-containing resin composition.

The (meth)acryl-silicone copolymer can be obtained, for example, by reacting a methyl (meth)acrylate, a reactive silicone (for example, a mercapto-modified silicone or a methacryl-modified silicone) and, if desired, the above-described optional monomers in the presence of a radical polymerization initiator. Commonly utilized thermal polymerization initiators or photopolymerization initiators may be utilized as the radical polymerization intitiators.

Thermal polymerization initiators can include, for example, an azo compound, a peroxide, a hydroxy peroxide, a peracid or a perester. Exemplary azo compounds include 2,2'-azobis-isobutyronitrile, 2,2'-azobis(2-methylbutyronitrile), dimethyl 2,2'-azobis-isobutyrate, dimethyl 2,2'-azobis(2-methylpropionate), azobis-diphenylmethane and 4,4'-azobis-(4-cyanopentanoic acid). Exemplary peroxide compounds include benzoyl peroxide, tert-butyl peroxide, cyclohexanone peroxide, methyl ethyl ketone peroxide and hydrogen peroxide. Exemplary hydroxy peroxide compounds include tert-butyl hydroperoxide and cumene hydroperoxide. Exemplary peracid compounds include peracetic acid, perbenzoic acid and potassium persulfate. Exemplary perester compounds include diisopropyl percarbonate.

Photopolymerization initiators that can be utilized include, for example, an alkylphenone-based photopolymerization initiator, an acylphosphine oxide-based photopolymerization initiator, a benzophenone-based photopolymerization initiator, a thioxanthone-based photopolymerization initiator such as 2-isopropylthioxanthone, a benzyl, a quinone derivative and a 3-ketocoumarin. One or more than one of these compounds may be used. In some embodiments where a photopolymerization initiator is utilized, a sensitizer may be used in combination therewith.

The (meth)acryl-silicone copolymer can be prepared by solution polymerization in a solvent. The solvent used for solution polymerization can be an arbitrary organic solvent that is inert to the monomers and reaction product in the radical polymerization and that does not have a deleterious effect on the reaction. In some embodiments, the solvent can be a liquid between −10° C. and 50° C. In some embodiments, an ester-based solvent, a ketone-based solvent, an alcohol-based solvent or toluene may be used. Exemplary ester-based solvents include ethyl acetate and butyl acetate. Exemplary ketone-based solvents include acetone, methyl ethyl ketone, methyl isobutyl ketone and methyl propyl ketone. Exemplary alcohol-based solvents include methanol, ethanol, isopropanol and butanol.

The radical polymerization reaction may be performed by charging a methyl (meth)acrylate, a reactive silicone, a radical polymerization initiator and a solvent in a reaction vessel. In some embodiments, optional components such as optional monomers can also be charged. The radical polymerization initiator can be decomposed using light or heat. In some embodiments, the entire amounts of the methyl (meth)acrylate and the reactive silicone may be charged into the vessel at one time and polymerized. In some embodiments, the methyl (meth)acrylate and/or the reactive silicone may be charged into the vessel in discrete portions. In some embodiments, the methyl (meth)acrylate and/or the reactive silicone may be continuously charged into the vessel. The molecular structure of the obtained (meth)acryl-silicone copolymer can be adjusted based on the way in which the components are charged in the vessel. The (meth)acryl-silicone copolymer can be recovered by distillation of the solvent under atmospheric or reduced pressure or by reprecipitation in an appropriate solvent (e.g., methanol, hexane, water).

In the (meth)acryl-silicone copolymer, the weight ratios of the methyl (meth)acrylate moiety (i.e., the portion of the (meth)acryl-silicone copolymer derived from methyl (meth)acrylate) and the silicone moiety (i.e., the portion of the (meth)acryl-silicone copolymer derived from methyl (meth)acrylate) may be from 90:10 to greater than 50:50, from 80:20 to greater than 50:50, from 90:10 to 55:45, from 80:20 to 55:45, from 90:10 to 60:40, or from 80:20 to 60:40. Stated differently, the (meth)acryl-silicone copolymer contains less than 50 weight percent silicone based on a total weight of the copolymer. For example, the (meth)acryl-silicone copolymer may contain 10 to less than 50 weight percent silicone, 10 to 45 weight percent silicone, 10 to 40 weight percent silicone, 10 to 30 weight percent silicone, or 10 to 20 weight percent silicone. With compositions in these weight ratio ranges, the (meth)acryl-silicone copolymers tend to exhibit properties such as releasibility and tend to have suitable miscibility with the PLA when included in the PLA-containing resin compositions.

Various ratios of PLA and the (meth)acryl-silicone copolymer can be utilized in PLA-containing resin compositions. When the amount of PLA is 99 weight percent or less based on the total weight of the PLA and the (meth)acryl-silicone copolymer, the properties of the silicone moiety of the (meth)acryl-silicone copolymer, such as releasability, can be imparted to the PLA-containing resin composition. When the amount of PLA is 50 weight percent or more based on the total weight of the PLA and the (meth)acryl-silicone copolymer, the advantages of the PLA, for example, the environmentally advantageous properties, can be realized in the PLA-containing resin composition. The weight ratio between the PLA and the (meth)acryl-silicone copolymer may be from 99:1 to 50:50, from 97:3 to 50:50, from 91:9 to 50:50, from 99:1 to 60:40, from 97:3 to 60:40, from 91:9 to 60:40, from 99:1 to 70:30, from 97:3 to 70:30, or from 91:9 to 70:30.

In some embodiments where the PLA-containing resin composition is a partially miscible system blend, a (meth)acrylic graft copolymer or a (meth)acrylic block copolymer that includes a PLA within the molecule may be added to further stabilize the phase separated system.

(Meth)acrylic graft copolymers, if utilized, can include various block copolymers having a PLA and a (meth)acrylic polymer. An example is a (meth)acrylic graft copolymer where a PLA having a weight average molecular weight of about 2,000 grams/mole or more can be grafted to the main chain formed from the polymerization of a (meth)acrylic acid ester. Examples of (meth)acrylic acid esters include, but are not limited to, a (meth)acrylic acid, a 2-hydroxyethyl (meth)acrylate, a glycidyl (meth)acrylate and an N,N-dimethylaminoethyl (meth)acrylate. The PLA may be any of the PLAs discussed above, or may be other types of PLA. In some embodiments, a graft chain including a PLA can prevent or minimize the phase separation structure of the PLA and the (meth)acryl-silicone copolymer.

(Meth)acrylic block copolymers, if utilized, can include various block copolymers having a PLA block and a (meth)acrylic polymer block. The PLA block may be any of the PLAs discussed above, or may be other types of PLA. The (meth)acrylic polymer block can be derived from a (meth)acrylic acid ester or other acryl monomers. Examples of (meth)acrylic acid esters include, but are not limited to, a (meth)acrylic acid, a 2-hydroxyethyl (meth)acrylate, a glycidyl (meth)acrylate and an N,N-dimethylaminoethyl (meth)acrylate. The (meth)acrylic block copolymer may function as a compatibilizer, or the like.

In addition to the PLA and the (meth)acryl-silicone copolymer, the PLA-containing resin composition may also optionally contain one or more than one kind of additive. Exemplary additives include antioxidants, heat stabilizers, light stabilizers, antistatic agents and flame retardants. Such additives may be blended in known amounts to produce the desired effects.

The PLA-containing resin composition can be prepared by mixing the PLA, the (meth)acryl-silicone copolymer and, if desired, the above-described optional components. The mixing method can be selected considering the amount or properties of the components mixed. Any suitable mixing method can be used such as those that that are solvent based non-solvent methods such as melt-kneading techniques.

In some embodiments where the components are mixed using a solvent, the PLA and the (meth)acryl-silicone copolymer can be dissolved in an appropriate solvent such as acetone, methyl ethyl ketone, chloroform, 1,4-dioxane, N,N-dimethylformamide or dimethylsulfoxide, and the solution can then be subjected to stirring, shaking or the like, whereby mixing can be effected. The PLA and the (meth)acryl-silicone copolymer may be dissolved in the same solvent, or different solvents and then mixed together.

In some embodiments where the components are mixed using melt kneading, the PLA and the (meth)acryl-silicone copolymer may be mixed in a solid state using known melt-kneading techniques and known apparatuses, such as twin-screw kneaders, Henschel mixers or ribbon blenders. Melt kneading can be advantageous for profitability and minimizing the environmental impact of the process. The melt kneading temperature may be a temperature at which the PLA and the (meth)acryl-silicone copolymer are sufficiently mixed. In some embodiments, the temperature can be about 100° C. or more, about 120° C. or more, about 140° C. or more, or about 160° C. or more.

The PLA-containing resin composition can be formed into articles of various shapes using known techniques. For example, the PLA-containing resin composition can be dissolved in a solvent. The resulting solution containing the PLA-containing resin composition can be cast on an appropriate substrate using known solution casting methods for film formation and then dried to form a PLA-containing resin film or sheet. PLA-containing resin compositions that include a solvent may be concentrated or diluted with the solvent, if desired, to adjust the concentration.

A shaped article may be produced from the PLA-containing resin composition using injection molding methods, extrusion blow molding methods, extrusion stretch-blow molding methods, injection blow molding methods, injection stretch-blow molding methods, biaxial stretching methods, thermoforming methods, compression molding methods or the like. A film-shaped, sheet-shaped or plate-shaped article may also be produced using general extrusion molding methods such as T-die molding methods, blow molding methods or inflation molding methods. After preparing a PLA-containing resin composition by melt-kneading, the melt-kneaded composition may be subsequently shaped using T-die molding methods, blow molding methods, inflation molding methods or the like.

In some embodiments, the PLA-containing resin composition can be made to have a film or sheet form. "Film" and "sheet" as used herein generally have the same meaning and refer to a thin, rectangular article having a thickness less than about 3 millimeters. For example, as originally formed, the thickness is often in the range of about 5 micrometers to about 3 millimeters. Shaped articles can also be stretched to prepare films that have thicknesses of less than 5 micrometers. A PLA-containing resin film or PLA-containing resin sheet (hereinafter, referred to as "PLA-containing resin films") may have a thickness that is larger or smaller than the above-described thickness. A PLA-containing resin film may have a single-layer structure or a multilayer structure that includes two or more layers.

In some embodiments, a PLA-containing resin film having a thickness of 30 micrometers may have a haze value of about 10 percent or less. Haze values of about 10 percent or less can indicate that the (meth)acryl-silicone copolymer is successfully mixed with the PLA and that these two polymeric materials are at least partially if not fully compatibilized with each other. The haze value, as discussed herein can be measured in accordance with JIS K 7136. In some embodiments, a PLA-containing resin film having a thickness of 30 micrometers may have a haze value of about 8 percent or less or about 5 percent or less.

The peel force as used herein can refer to the peel force of the PLA-containing resin film in comparison to a film containing PLA only when the film is positioned adjacent to a pressure-adhesive layer. Specifically, the peel force can be evaluated by laminating the PLA-containing resin film to a pressure-sensitive adhesive tape such as the pressure sensitive adhesive tape commercially available under the trade designation SCOTCH 810 from Sumitomo 3M Limited (Tokyo, Japan) and measuring the peel force. This peel strength can be compared to that of a sample prepared by laminating a PLA only film to the same pressure-sensitive adhesive tape. The measurement can be made in accordance with JIS Z 0237. It should be noted that JIS Z 0237 is designed to measure the self adhesive force of a pressure-sensitive adhesive tape. Peel force, on the other hand indicates the releasability of a film. The self-adhesive force and the peel force are therefore inverses of each other, but have the same numerical value.

In some embodiments, PLA-containing resin films having a thickness of 30 micrometers may have a peel force of about 65 percent or less than a PLA only resin film. The lower peel force of the PLA-containing resin film indicates that the (meth)acryl-silicone copolymer is effectively mixed with the PLA and these two components are at least partially compatiblized with each other. In some embodiments, a PLA-containing resin film having a thickness of 30 μm may have a peel force of about 60% or less, about 50 percent or less, or about 40 percent or less than a PLA only film.

In some embodiments, PLA-containing resin films are releasable or demoldable, due to the silicone moiety, and therefore can be used as release liners or releasable sheets. Release liners (which can also be referred to as releasable liners or releasable sheets or release sheets) can be positioned adjacent to and in contact with pressure-sensitive adhesive sheets, for example in the healthcare industry or for architectural decorations. PLA-containing resin films or PLA-containing resin release films can be utilized for intermediate processing in producing other articles. That is, the release films can be used to protect the pressure-sensitive adhesive layer until the pressure-sensitive adhesive is contacted with the desired substrate. Regardless of the specific usage, the characteristics and features of the PLA can be advantageous in minimizing the environmental impact when it is necessary to discard the release liner.

FIG. 1 illustrates a PLA-containing resin film 10 containing a PLA and (meth)acryl-silicone copolymer and a second PLA-containing resin film 20, which are stacked to produce a PLA-containing resin release film laminate 30. The second PLA-containing resin film 20 may be releasable or non-releasable. By controlling the peel force of the PLA-containing resin film 10, the PLA-containing resin release film laminate 30 can be used as a single-sided releasable or double-sided releasable liner with the second PLA-containing resin film 20 being the substrate, or a backing material with a back coating for tapes. In this case, the laminate as a whole can make use of the above-described characteristic features of the polylactic acid, and therefore the environmental impact when discarding the laminate can be reduced. The laminate 30 may be produced by separately forming the PLA-containing resin film 10 and the second PLA-containing resin film 20 and then laminating these films together by thermo-compression bonding. Alternatively, the film formation and lamination may be simultaneously performed using a multilayer extrusion die or the like.

In the production of a pressure-sensitive adhesive tape, the production process of the laminate can be solventless by simultaneously using melt kneading and extrusion. If hot-melt pressure-sensitive adhesive is being utilized, the production processes of pressure-sensitive adhesive/substrate/back coating can all be solventless to minimize the environmental impact.

While the present disclosure is not so limited, an appreciation of various aspects of the disclosure will be gained through a discussion of the examples provided below.

EXAMPLES

The PLA utilized in the Examples and Comparative Examples is commercially available under the trade designation LACEA H440 from Mitsui Chemicals, Inc., Tokyo, Japan.

KF-2001 silicone oil, KF-410 methylstyryl-modified silicone oil, X-22-167B silicone oil, and X-22-174DX silicone oil were obtained from Shin-Etsu Chemical Co., Ltd., Tokyo, Japan.

2,2'-azobis(2,4-dimethylvaleronitrile (V-65) was obtained from Wako Pure Chemical Industries, Ltd., Osaka, Japan.

Methyl acrylate (MA) was obtained from Wako Pure Chemical Industries, Ltd., Osaka, Japan.

Methyl (meth)acrylate (MMA) was obtained from Wako Pure Chemical Industries, Ltd., Osaka, Japan.

All amounts given herein are given on the basis of weight unless indicated otherwise.

Peel Force

Peel force was measured in accordance with JIS Z 0237. It should be noted that JIS Z 0237 is designed to measure the self adhesive force of a pressure-sensitive adhesive tape. Peel force, on the other hand indicates the releasability of a film. The self-adhesive force and the peel force are therefore inverses of each other, but have the same numerical value. Specifically, the peel force of a PLA-containing composition to be tested was measured by first laminating a 30 μm thick film of the composition to an 18 mm wide pressure-sensitive adhesive tape (commercially available under the trade designation SCOTCH 810 tape from Sumitomo 3M Limited (Tokyo, Japan). Pressure was applied to the laminate by rolling the laminate back and forth (once each) with a 2000 gram roller (300 mm/minute). The laminate was then left to stand overnight at room temperature. A composition containing only the PLA in the PLA-containing composition was then also formed into a 30 μm film and laminated in the same fashion to the pressure-sensitive adhesive tape.

The pressure-sensitive adhesive tape was then continuously peeled off using a tensile tester (Autograph AG-X 100N, manufactured by Shimadzu Corp., Kyoto, Japan) at a peel angle of 180° and a peel rate of 300 mm/min. The load at this time was measured as a release force. The same procedure was carried out on the PLA only composition and the two values were compared to obtain a percent.

Residual Adhesive Force

After the measurement of the peel force, the pressure-sensitive adhesive tape (that was previously laminated to the PLA-containing film to be tested) was laminated to an unused untreated polyester film and pressure adhered by passing a roller of 2,000 grams over and back (300 mm/min). The adhesive force was measured 30 minutes after the peel force was measured and is reported as the residual adhesive force (peel angle: 180°, peel rate: 300 mm/min).

Haze Value

The haze value of a sample was measured using a turbidimeter model NDH2000 from Nippon Denshoku Industries Co., Ltd. (Tokyo, Japan) in accordance with JIS K 7136.

Example 1

0.08 parts of 2,2'-azobis(2,4-dimethylvaleronitrile (V-65) were added to a solution containing 28 parts of methyl acrylate (MA), 12 parts of KF-2001 as a side-chain mercapto-modified reactive silicone, and 40 parts of methyl ethyl ketone. The weight ratio was 70:30 (MA:KF-2001) The solution was nitrogen purged for 10 minutes, and then the reaction was allowed to proceed for 24 hours in a constant-temperature bath at 50° C. A transparent viscous solution was obtained. The weight average molecular weight acryl-silicone copolymer was 54,000 grams/mole.

The acryl-silicone copolymer solution was dried and then re-dissolved in 1,4-dioxane to prepare a solution having a solid content of 15 weight percent. Separately, PLA was dissolved in 1,4-dioxane to prepare a solution having a solid content of 15 weight percent. 21 parts of the 15 weight percent PLA solution and 9 parts of the 15 weight percent acryl-silicone copolymer solution were mixed to prepare a coating solution.

This solution was knife coated onto a 50 μm-thick untreated polyester film substrate by adjusting the gap to 500 μm. The coated film was then dried in an oven at 100° C. for 7 minutes. After cooling to room temperature, the coating was separated from the polyester film to obtain a 30 μm-thick PLA/acryl-silicone copolymer blend film. The weight ratio between the PLA and the acryl-silicone copolymer in the dry film was 70:30.

The peel force, residual adhesive force and haze value were measured and are shown in Table 1.

Examples 2 and 3

PLA/acryl-silicone copolymer films were obtained as described in Example 1 except that 30 parts (Example 2) and 32.5 parts (Example 3) of a 15 weight percent PLA solution; and 3 parts (Example 2) and 1 part (Example 3) of the 15 weight percent acryl-silicone copolymer were utilized. The weight ratio between the PLA and the acryl-silicone copolymer in the dry films were 91:9 (Example 2) and 97:3 (Example 3) respectively.

The peel force, residual adhesive force and haze values were measured and are shown in Table 1.

Example 4

An acryl-silicone copolymer was obtained as described in Example 1 except that a solution with a weight ratio of 65:35 (MA:KF-2001) was utilized to provide 26 parts MA and 14 parts KF-2001. The weight average molecular weight of the acryl-silicone copolymer was 47,000 grams/mole.

A PLA/acryl-silicone copolymer film was produced as described in Example 1 and the peel force, residual adhesive force and haze value were measured and are shown in Table 1.

Example 5

An acryl-silicone copolymer was obtained as described in Example 1 except that a solution with a weight ratio of 75:25 (MA:KF-2001) was utilized to provide 30 parts of MA and 10 parts of KF-2001. The weight average molecular weight of the acryl-silicone copolymer was 63,000 grams/mole.

A PLA/acryl-silicone copolymer film was produced as described in Example 1 and the peel force, residual adhesive force and haze value were measured and are shown in Table 1.

Example 6

An acryl-silicone copolymer was obtained as described in Example 1 except that a solution with a weight ratio of 80:30 (MA:KF-2001) was utilized to provide 32 parts of MA and 8 parts of KF-2001. The weight average molecular weight of the acryl-silicone copolymer was 72,000 grams/mole.

A PLA/acryl-silicone copolymer film was produced as described in Example 1 and the peel force, residual adhesive force and haze value were measured and are shown in Table 1.

Examples 7 and 8

PLA/acryl-silicone copolymer films were obtained as described in Example 6 except that 30 parts (Example 7) and 32.5 parts (Example 8) of the 15 weight percent PLA solution and 3 parts (Example 7) and 1 part (Example 8) of the 15 weight percent acryl-silicone copolymer solution were utilized. A film was produced as described in Example 1 and the peel force, residual adhesive force and haze values were measured and are shown in Table 1.

Example 9

An acryl-silicone copolymer was obtained as described in Example 1 except that a solution with a weight ratio of 90:10 (MA/KF-2001) was utilized to provide 36 parts of MA and 4 parts of KF-2001. The weight average molecular weight of the acryl-silicone copolymer was 120,000 grams/mole.

A PLA/acryl-silicone copolymer film was produced as described in Example 1 and the peel force, residual adhesive force and haze value were measured and are shown in Table 1.

Examples 10 and 11

PLA/acryl-silicone copolymer films were obtained as described in Example 9 except that 20 parts (Example 10) and 16.5 parts (Example 11) of the 15 weight percent PLA solution and 13.3 parts (Example 10) and 16.5 parts (Example 11) of the 15 weight percent acryl-silicone copolymer solution were utilized. The weight ratio between the PLA and the acryl-silicone copolymer in the dry film was 60:40 (Example 10) and 50:50 (Example 11) respectively. The peel force, residual adhesive force and haze values were measured and are shown in Table 1.

Comparative Example 1

A 15 weight percent PLA solution was obtained as described in Example 1 and was coated on an untreated polyester film. The peel force, residual adhesive force and haze value were measured and are shown in Table 1.

Comparative Example 2

An acryl-silicone copolymer was obtained as described in Example 1 except that a solution having a weight ratio of 50:50 (MA:KF-2001) was utilized to provide 20 parts of MA and 20 parts of KF-2001. The weight average molecular weight of the acryl-silicone copolymer was 30,000 grams/mole.

A PLA/acryl-silicone copolymer film was produced as described in Example 1. Whitish fouling was observed on the polyester film after separating the film. The mixing weight ratio of the PLA and the acryl-silicone copolymer in the dry film was 70:30 respectively. The haze value was measured and the film was determined to be an extremely phase-separated film with a haze value of 34.7 percent (see Table 1). The peel force and residual adhesive force were not measured.

Comparative Example 3

An acryl-silicone copolymer was obtained as described in Example 1 except that a solution with a weight ratio of 40:60 (MA:KF-2001) was used to provide 16 parts of MA and 24 parts of KF-2001. The weight average molecular weight of the acryl-silicone copolymer was 26,000 grams/mole.

A PLA/acryl-silicone copolymer film was produced as described in Example 1. Whitish fouling was observed on the polyester film after separating the film. The mixing ratio between the PLA and the acryl-silicone copolymer in the dry film was 70:30. The haze value of the film was measured and the film was determined to be an extremely phase-separated film with a haze value of 53.6 percent (see Table 1). The peel force and residual adhesive force were not measured.

Comparative Example 4

An acryl-silicone copolymer was obtained as described in Example 1 except that a solution with a weight ratio of 30:70 (MA:KF-2001) was utilized that provided 12 parts of MA and 28 parts of KF-2001. The weight average molecular weight of the acryl-silicone copolymer was 24,000 grams/mole.

A PLA/acryl-silicone copolymer film was produced as described in Example 1. Whitish fouling was observed on the polyester film after separating the film. The weight ratio between the PLA and the acryl-silicone copolymer in the dry film was 70:30. The haze value was measured and the film was determined to be an extremely phase-separated film with a haze value of 64.5 percent (see Table 1). The peel force and residual adhesive force were not measured.

Comparative Examples 5 to 8

PLA and KF-2001 silicone oil were each dissolved in chloroform to prepare separate 15 weight percent solutions. PLA-silicone oil films were produced as described in Example 1 to provide the ratios of PLA and KF-2001 silicone oil shown in Table 1. The peel force, residual adhesive force and haze values were measured and are shown in Table 1.

Comparative Examples 9 to 12

PLA and KF-410 were each dissolved in 1,4-dioxane to prepare 15 weight percent solutions. PLA-silicone oil films were produced as described in Example 1 using ratios of PLA and KF-410 silicone oil as shown in Table 1. The peel force and haze values were measured and are shown in Table 1. Since these films had a very high peel force (see Table 1), the measurement of residual adhesive force was not performed. Comparative Examples 11 and 12 had very high haze values and bleed-out of the silicone oil was observed.

TABLE 1

| Example | Ratio of Copolymer MA/KF-2001 (wt %/wt %) | Ratio of Composition PLA/copolymer (wt %/wt %) | Haze Value (%) | Peel Force (N/18 mm) | Residual Adhesive Force (N/18 mm) |
|---|---|---|---|---|---|
| 1 | 70/30 | 70/30 | 3.4 | 0.047 | 7.55 |
| 2 | 70/30 | 91/9 | 0.8 | 0.122 | 7.8 |
| 3 | 70/30 | 97/3 | 0.7 | 5.05 | 8.43 |
| 4 | 65/35 | 70/30 | 5.0 | 0.043 | 8.0 |
| 5 | 75/25 | 70/30 | 0.6 | 0.041 | 8.1 |
| 6 | 80/20 | 70/30 | 0.5 | 0.05 | 8.1 |
| 7 | 80/20 | 91/9 | 0.8 | 1.46 | 8.65 |
| 8 | 80/20 | 97/3 | 1.1 | 5.75 | 8.03 |
| 9 | 90/10 | 70/30 | 2.3 | 1.08 | 8.43 |
| 10 | 90/10 | 60/40 | 5.2 | 1.45 | 7.3 |
| 11 | 90/10 | 50/50 | 7.7 | 1.3 | 7.3 |
| C 1 | — | (100/0) | 0.3 | 9.45 | 6.85 |
| C 2 | 50/50 | 70/30 | 34.7 | — | — |
| C 3 | 40/60 | 70/30 | 53.6 | — | — |
| C 4 | 30/70 | 70/30 | 64.5 | — | — |
| C 5 | — | 98.5/1.5* | 9.44 | 7.5 | 6.8 |
| C 6 | — | 95.2/4.8* | 27.79 | 7.3 | 7.3 |
| C 7 | — | 91/9* | 42.11 | 7.0 | 7.1 |
| C 8 | — | 83/17* | 56.43 | 6.7 | 6.5 |
| C 9 | — | 98.5/1.5** | 4.0 | 8.91 | — |
| C 10 | — | 95.2/4.8** | 11.1 | 8.8 | — |
| C 11 | — | 91/9** | 24.3 | 8.36 | — |
| C 12 | — | 83/17** | 40.5 | 7.95 | — |

*KF-2001 was used in place of an acryl-silicone copolymer.
**KF-410 was used in place of an acryl-silicone copolymer.

Comparative Examples 13 to 15

Poly(methyl acrylate) was prepared as described in Example 1 by using 15 parts of methyl acrylate, 85 parts of methyl ethyl ketone and 0.04 parts of V-65. The weight average molecular weight of the poly(methyl acrylate) was 65,000 grams/mole.

PLA-poly(methyl acrylate) films were produced as described in Example 1 with ratios as shown in Table 2. The peel force, residual adhesive force and haze values were measured and are shown in Table 2.

Comparative Examples 16 to 18

PLA, poly(methyl acrylate) (as prepared in Comparative Examples 13 to 15) and KF-2001 silicone oil were each dissolved in chloroform to prepare 15 weight percent solutions. PLA-poly(methyl acrylate)-silicone oil films were produced as described in Example 1 with the ratios as shown in Table 2. The peel force, residual adhesive force and haze values were measured and are shown in Table 2.

TABLE 2

| Example | Ratio PLA/PMA/KF-2001 (wt %/wt %/wt %) | Haze Value (%) | Peel Force (N/18 mm) | Residual Adhesive Force (N/18 mm) |
|---|---|---|---|---|
| C 13 | 50/50/— | 14.29 | 8.75 | 7.5 |
| C 14 | 70/30/— | 7.21 | 8.75 | 7.4 |
| C 15 | 91/9/— | 2.93 | 9.35 | 7.7 |
| C 16 | 70/27/3 | 56.15 | 8.56 | 5.8 |
| C 17 | 70/24/6 | 78.82 | 7.63 | 6.5 |
| C 18 | 70/21/9 | 85.25 | 7.65 | 6.3 |

Examples 12 to 19 and Comparative Examples 19 and 20

Films were produced as described in Example 1 except that the components were changed as shown in Table 3. The peel force, residual adhesive force and haze values were measured and are shown in Table 3. Table 3 repeats the results of Example 4 and Comparative Example 2 for the sake of comparison.

Comparative Examples 19 and 20 (similarly to Comparative Example 2) had whitish fouling of the polyester film after separating the PLA containing films. The haze values were measured and the films were determined to be extremely phase-separated films with haze values of 10.34% and 17.21% respectively. The peel force and residual adhesive force were not measured on these samples.

Example 20

A copolymer was obtained as described in Example 1 except that 16 parts of MA, 4 parts of X-22-167B, 20 parts of methyl ethyl ketone and 0.04 parts of V-65 were utilized.

A PLA/acryl-silicone copolymer film was produced as described in Example 1 having the ratio shown in Table 3 from the acryl-silicone copolymer solution obtained above. The peel force, residual adhesive force and haze value were measured and are shown in Table 3.

Example 21

A copolymer was obtained as described in Example 1 except that 3.9 parts of MA, 2.1 parts of X-22-174DX, 34 parts of methyl ethyl ketone and 0.024 parts of V-65 were utilized.

A PLA/acryl-silicone copolymer film was produced as described in Example 1 having the ratio shown in Table 3. The peel force, residual adhesive force and haze value were measured and are shown in Table 3.

Example 22

A copolymer was obtained as described in Example 1 except that 11 parts of methyl (meth)acrylate (MMA), 9 parts of KF-2001, 20 parts of methyl ethyl ketone and 0.04 parts of V-65 were utilized.

A PLA/methacryl-silicone copolymer film was produced as described in Example 1 having the ratio shown in Table 3. The peel force, residual adhesive force and haze values were measured and are shown in Table 3.

TABLE 3

| Example | Ratio of Copolymer MA/KF-2001 (wt %/wt %) | Ratio of Composition PLA/copolymer (wt %/wt %) | Haze Value (%) | Peel Force (N/18 mm) | Residual Adhesive Force (N/18 mm) |
|---|---|---|---|---|---|
| 4 | 65/35 (Mol. Wt. 47,000) | 70/30 | 5.0 | 0.043 | 8.0 |
| 12 | 65/35 | 91/9 | 1.06 | 0.055 | 8.6 |
| 13 | 65/35 | 97/3 | 0.93 | 1.68 | 8.5 |
| C 19 | 60/40 | 70/30 | 10.34 | — | — |
| 14 | 60/40 (Mol. Wt. 41,000) | 91/9 | 2.1 | 0.052 | 7.9 |
| 15 | 60/40 | 97/3 | 0.95 | 0.61 | 8.6 |
| C 20 | 55/45 | 70/30 | 17.21 | — | — |
| 16 | 55/45 (Mol. Wt. 39,000) | 91/9 | 3.83 | 0.054 | 8.3 |
| 17 | 55/45 | 97/3 | 1.39 | 0.2 | 8.2 |
| C 2 | 50/50 (Mol. Wt. 30,000) | 70/30 | 34.7 | — | — |

TABLE 3-continued

| Example | Ratio of Copolymer MA/KF-2001 (wt %/wt %) | Ratio of Composition PLA/copolymer (wt %/wt %) | Haze Value (%) | Peel Force (N/18 mm) | Residual Adhesive Force (N/18 mm) |
| --- | --- | --- | --- | --- | --- |
| 18 | 50/50 | 91/9 | 6.36 | 0.071 | 7.7 |
| 19 | 50/50 | 97/3 | 2.32 | 0.41 | 8.3 |
| 20 | 80/20* (Mol. Wt. 26,000) | 70/30 | 4.8 | 0.14 | 8.3 |
| 21 | 65/35** (Mol. Wt. 77,000) | 91/9 | 4.0 | 3.45 | 7.7 |
| 22 | 55/45*** (Mol. Wt. 40,000) | 70/30 | 6.4 | 2.65 | 7.6 |

*Example 20 included X-22-167B in place of KF-2001 silicone oil
**Example 21 included X-22-174DX in place of KF-2001 silicone oil
***Example 22 included Methyl (meth)acrylate (MMA) in place of Methyl acrylate.

Example 23

A resin kneader (HAAKE MiniLab from Thermo Scientific) was preheated at 200° C., and 5.5 grams of PLA was charged into the kneader over 5 minutes at a screw rotation speed of 12 rpm/rotation in the same direction. Next, 0.5 grams of an acryl-silicone copolymer was charged over 5 minutes while keeping the screw rotation speed at 12 rpm. After kneading for 10 minutes by increasing the rotation speed to 50 rpm, a strand-like compound was taken out from the take-out port.

This compound was sandwiched between two polyimide films and formed into a film by a heat pressing machine at 200° C. to obtain a 105 μm-thick film. The peel force, residual adhesive force and haze value were measured and are shown in Table 4.

TABLE 4

| Example | Ratio of Copolymer MA/KF-2001 (wt %/wt %) | Ratio of Composition PLA/copolymer (wt %/wt %) | Haze Value (%) | Peel Force (N/18 mm) | Residual Adhesive Force (N/18 mm) |
| --- | --- | --- | --- | --- | --- |
| 23 | 70/30 | 91/9 | 2.7 | 0.06 | 7.3 |

Example 24

A PLA/acryl-silicone copolymer film was produced as described in Example 2 except that the coating solution was applied with a 200 μm gap instead of a 500 μm gap.

The coated surface of this film (with a polyester substrate) and the coated surface of the PLA only film (with a polyester substrate) obtained as described in Comparative Example 1 were laminated to each other using a heat laminator at 120° C. and 0.2 m/min. After lamination, the polyester substrates on both surfaces were peeled off. The haze value of the laminate film, and the peel force and residual adhesive force of each of the surfaces: A (the PLA/acryl-silicone copolymer film side) and B (the PLA only film side) were measured. The results are shown in Table 5.

TABLE 5

| | Ratio of Copolymer MA/KF-2001 (wt %/wt %) | Ratio of Composition PLA/copolymer (wt %/wt %) | Haze Value (%) | Peel Force (N/18 mm) | Residual Adhesive Force (N/18 mm) |
| --- | --- | --- | --- | --- | --- |
| Surface A | 70/30 | 91/9 | 2.5 | 0.085 | 8.0 |
| Surface B | — | 100/0 | | 10.2 | 7.4 |

Thus, embodiments of PLA-containing resin compositions and films are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present disclosure is limited only by the claims that follow.

The invention claimed is:

1. A release film formed from a polylactic acid-containing resin composition comprising:
    a polylactic acid; and
    a (meth)acryl-silicone copolymer formed from (i) methyl (meth)acrylate and (ii) a reactive silicone having a reactive group selected from a (meth)acryloyl group or a mercapto group, wherein the (meth)acryl-silicone copolymer has a weight average molecular weight of 25,000 or more and wherein the (meth)acryl-silicone copolymer comprises 10 to less than 50 weight percent of the silicone,
    wherein the weight ratio between the polylactic acid and the (meth)acryl-silicone copolymer is 99:1 to 50:50.

2. The release film according to claim 1, wherein the (meth)acryl-silicone copolymer is a graft copolymer and/or a block copolymer.

3. The release film according to claim 1, wherein a 30 μm-thick film formed from the polylactic acid-containing resin composition has a haze value, measured in accordance with JIS K 7136, of 10% or less.

4. The release film according to claim 1, wherein the release film is positioned adjacent to a pressure-sensitive adhesive layer.

5. The release film according to claim 4, wherein a 30 μm thick first film formed from the polylactic acid-containing resin composition has a peel force of 65 percent or less than the peel force of a 30 μm thick second film formed from a composition consisting only of the polylactic acid of the polylactic acid-containing resin composition.

6. A polylactic acid-containing resin release film laminate comprising:
    a first release film according to claim 1; and
    a second polylactic acid-containing resin film,
    wherein the second polylactic acid-containing resin film is stacked on the first release film.

7. The release film laminate according to claim 6, wherein the first release film is positioned adjacent to a pressure-sensitive adhesive layer.

* * * * *